United States Patent [19]

Baveja et al.

[11] Patent Number: 5,358,029
[45] Date of Patent: Oct. 25, 1994

[54] METHOD AND APPARATUS FOR USE IN PREDICTING FLOW OF FLUID THROUGH PASSAGES IN A PROPOSED AIRFOIL

[75] Inventors: Gurmohan S. Baveja, Lakewood; Robert M. Brozier, Mentor; Albert C. Hoekenga, North Canton, all of Ohio; Francis J. O'Connor, Barrington, R.I.

[73] Assignee: PCC Airfoils, Inc., Cleveland, Ohio

[21] Appl. No.: 98,969

[22] Filed: Jul. 29, 1993

[51] Int. Cl.[5] .......................... B22C 9/00; B22D 23/00
[52] U.S. Cl. ...................................... 164/516; 164/46; 164/122.1; 29/889.721
[58] Field of Search ................... 164/122.1, 122.2, 516, 164/46; 29/889.721

[56] References Cited

U.S. PATENT DOCUMENTS 4,447,466  5/1984  Jackson et al. ................. 164/46

FOREIGN PATENT DOCUMENTS 803650  10/1958  United Kingdom ........... 29/889.721

*Primary Examiner*—Kuang Y. Lin
*Attorney, Agent, or Firm*—Tarolli, Sundheim & Covell

[57] ABSTRACT

To predict the rate of flow of cooling fluid (gas) through a passage system in a proposed airfoil during operation of a Jet engine, a full size model of the passage system is prepared. The flow of air or other gas is conducted through the model of the passage system. The characteristics of the flow of air or gas through the model of the passage system is determined to enable the characteristics of the flow of cooling fluid through the passage system in the proposed airfoil to be predicted. The model of the cooling fluid passage system in the proposed airfoil is formed by covering the pattern with a layer of metal. The pattern is removed from the covering to form a passage system having a configuration corresponding to the configuration of the cooling fluid passage system in the proposed airfoil.

15 Claims, 3 Drawing Sheets

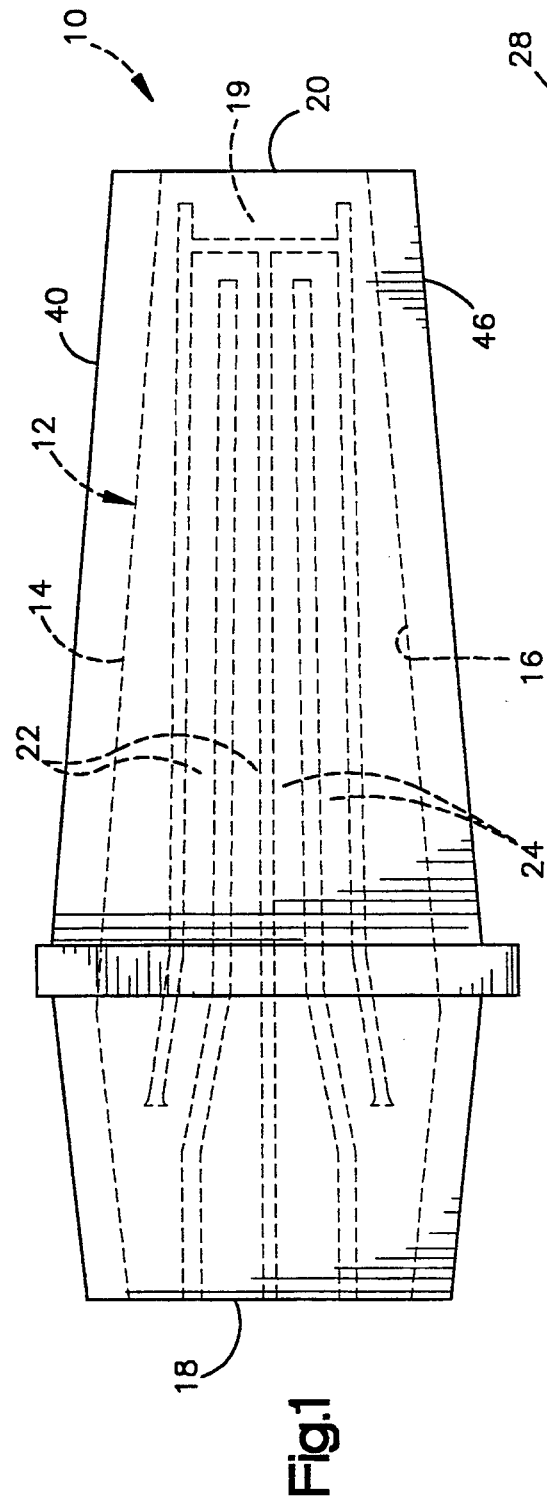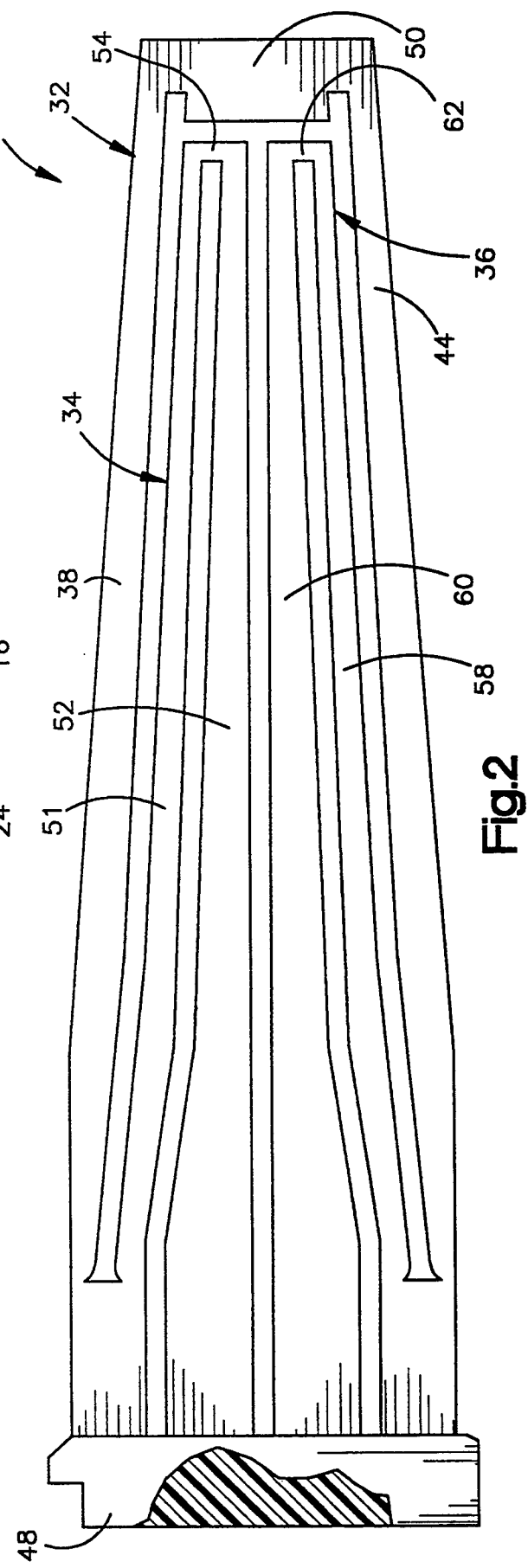

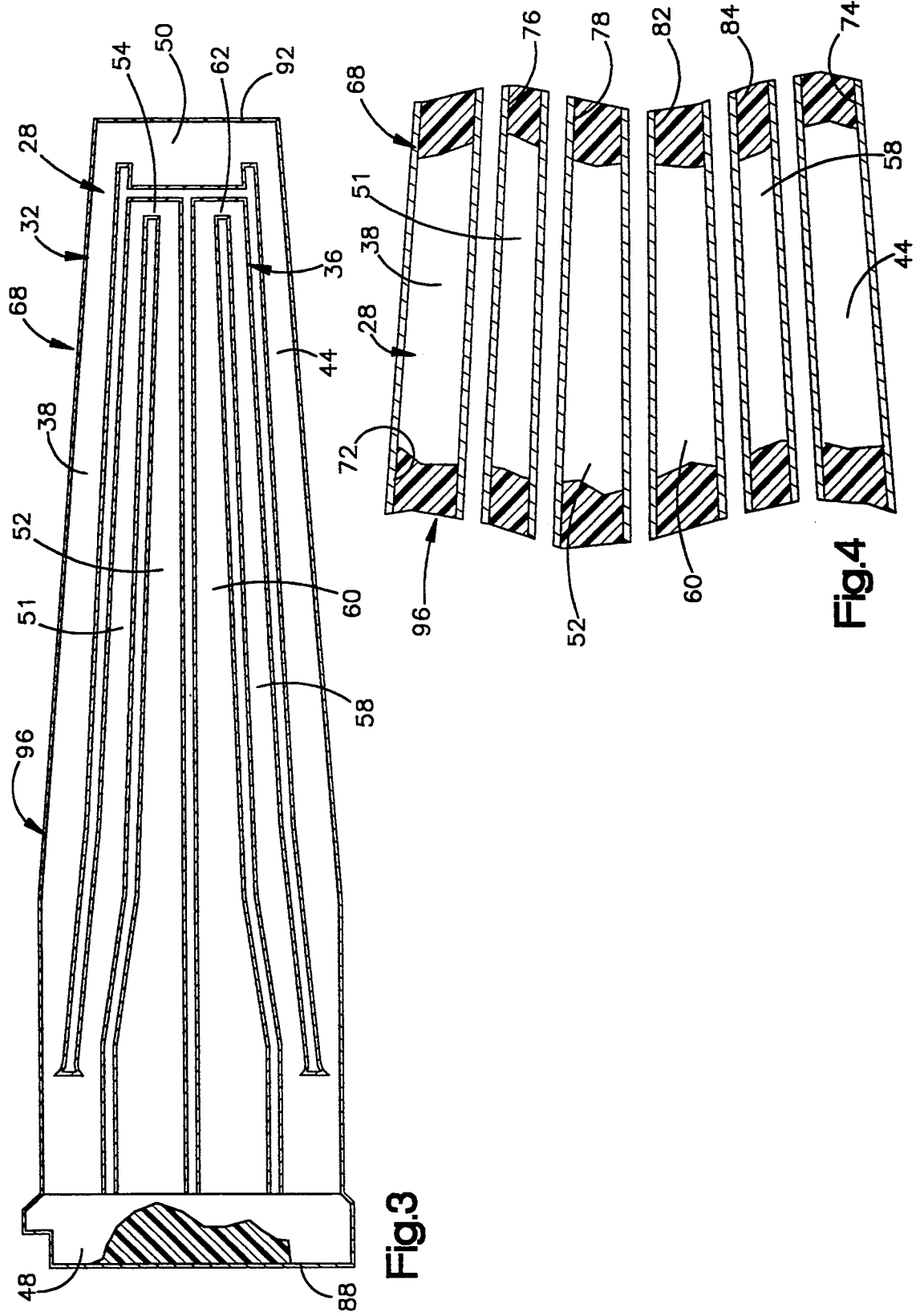

METHOD AND APPARATUS FOR USE IN PREDICTING FLOW OF FLUID THROUGH PASSAGES IN A PROPOSED AIRFOIL

BACKGROUND OF THE INVENTION

The present invention relates to the constructing of airfoils which are used in Jet engines.

Airfoils used in jet engines, such as blades and vanes used in turbine engines, commonly have an internal passage system for conducting a flow of cooling fluid (gas) during operation of the engine. In designing a new airfoil, it is desirable to be able to accurately predict the characteristics of cooling fluid flow through the passage system in the proposed airfoil. In the past, this has required building a prototype of the proposed airfoil. A fluid, such as air, is then conducted through the passage system in the prototype of the proposed airfoil to determine if the cooling fluid flow characteristics will be satisfactory. If the cooling fluid flow characteristics are not satisfactory, the design of the cooling fluid passage system in the proposed airfoil is modified and a second prototype is constructed and tested.

The time required to form and test a prototype airfoil is relatively long. Thus, a month or more may be required to make a ceramic core having a configuration corresponding to the configuration of a cooling fluid passage system in a proposed airfoil. Another two months or more may be required to form a mold and use the core in the mold to cast a prototype airfoil. Once the prototype airfoil has been constructed, the airfoil must be tested by conducting air through the cooling fluid passage system to determine if the desired flow characteristics have been obtained.

If the design of the cooling fluid passage system in the proposed airfoil is not satisfactory, a second prototype must be constructed. The time required to construct prototypes of the proposed airfoils is relatively long. In order to expedite the design, fabrication and use of new airfoils in Jet engines, it would be advantageous to reduce the amount of time required to determine if a cooling fluid passage system in a proposed airfoil is satisfactory.

SUMMARY OF THE INVENTION

The present invention relates to a new and improved method and apparatus for use in predicting the rate of flow of cooling fluid through a passage system in a proposed airfoil. A model of the passage system in the proposed airfoil is constructed by forming a pattern having the same configuration as the cooling fluid passage system in a proposed airfoil. The pattern is covered with a thin layer to form a covering over the pattern. The pattern is then removed from the covering.

Removing the pattern from the covering forms a passage system having a configuration corresponding to the configuration of the cooling fluid passage system in the proposed airfoil. A flow of fluid is then conducted through the passage system in the covering. A characteristic of the flow of fluid through the passage system in the covering is determined to enable the rate of flow of fluid through the passage system in the proposed airfoil to be predicted.

BRIEF DESCRIPTION OF THE INVENTION

The foregoing and other features of the invention will become more apparent upon a consideration of the following description taken in connection with the accompanying drawings, wherein:

FIG. 1 is a schematic illustration of a proposed airfoil having an internal passage system for conducting a flow of cooling fluid;

FIG. 2 is a schematic illustration, on an enlarged scale, of a pattern having a configuration which corresponds to the configuration of the cooling fluid passage system in the proposed airfoil of FIG. 1;

FIG. 3 is a schematic illustration, generally similar to FIG. 2, of the manner in which the pattern is enclosed by a thin covering;

FIG. 4 is an enlarged fragmentary sectional view of a portion of FIG. 3 further illustrating the relationship between the thin covering and the pattern.

DESCRIPTION OF SPECIFIC PREFERRED EMBODIMENTS OF THE INVENTION

Figure 5:
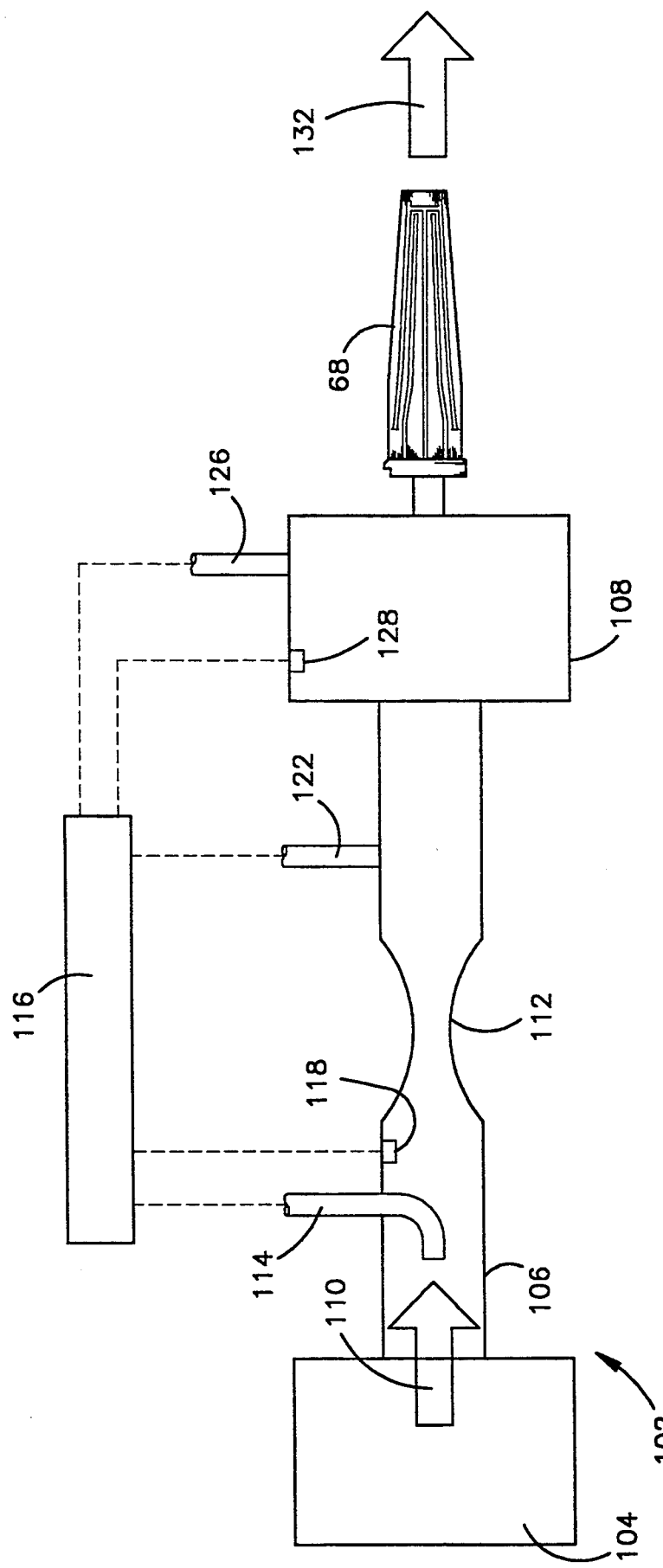
FIG. 5 is a schematic illustration depicting the manner in which a flow of fluid is conducted through a passage system in the covering after the pattern has been removed from the covering.

A proposed airfoil 10 which has never been constructed is illustrated in FIG. 1. The proposed airfoil 10 is a new design of an airfoil which is intended for use as a blade or vane in a turbine engine. The airfoil 10 has an internal cooling fluid passage system 12. The cooling fluid passage system 12 extends axially through the proposed airfoil 10. The passage system 12 is used to conduct cooling fluid during operation of the turbine engine in which the proposed airfoil is to be installed.

Although the cooling fluid passage system 12 could have many different configurations, in the proposed airfoil 10 (FIG. 1), the passage system includes main passages 14 and 16 which extend through the airfoil 10. Thus, the main passages 14 and 16 extend between a root end portion 18 and a passage 19 at a tip end portion 20 of the proposed airfoil 10. In addition to the main passages, the proposed airfoil 10 U-shaped central passages 22 and 24 which begin and end at the root end portion 18 of the airfoil 10. It should be understood that the proposed airfoil 10 is considered herein as being a new design of an airfoil to be constructed in the future. Of course, the proposed airfoil 10 could have many different constructions. However, the proposed airfoil 10 is generally similar to a CF6-80 second stage airfoil. It should be understood that the present invention is not to be limited to the design of any particular airfoil and it is contemplated that it will be used in conjunction with the design of many different types of airfoils.

A one-piece pattern 28, which is shown on an enlarged scale in FIG. 2, is a full size replica of the cooling fluid passage system 12 in the proposed airfoil 10. Although the proposed airfoil 10 has not yet been constructed, the pattern 10 is constructed from computer generated stereo-lithographic data and is the same size and configuration as the cooling fluid passage system 12 in the proposed airfoil 10. In the illustrated embodiment of the invention, the pattern 28 is formed of a suitable polymeric material, such as natural or synthetic wax. However, if desired, the pattern 28 could be formed of a ceramic core material, such as the ceramic core material disclosed in U.S. Pat. Nos. 3,266,893; 4,164,424; 4,583,581; or 5,014,763. Of course, if desired, the pattern 28 could be formed from other known core materials.

The wax pattern 28 has a main or base section 32 which extends around a pair of cantilevered center sections 34 and 36. The main section 32 and cantilevered center sections 34 and 36 have the same configuration as the cooling fluid passage system 12. Thus, the main section 32 of the one-piece pattern 28 includes an elongated edge section 38 which has a configuration corresponding to the configuration of the passage 14 adjacent to a trailing edge portion 40 of the proposed airfoil 10 (FIG. 1). Similarly, an elongated edge section 44 of the main section 32 of the pattern 28 (FIG. 2) has a configuration corresponding to the configuration of the passage 16 (FIG. 1) adjacent to a leading edge portion 46 of the proposed airfoil 10. The edge sections 38 and 44 (FIG. 2) of the pattern 28 are interconnected at opposite end sections 48 and 50.

The cantilevered center section 34 of the pattern 28 is integrally formed with the main section 32. Thus, the cantilevered center section 34 includes a pair of generally parallel arms 51 and 52 which are fixedly connected with the end section 48 of the pattern. The free ends of the arms 51 and 52 are interconnected by a short connector section 54. This results in the cantilevered center section 54 of the pattern 28 having an elongated U-shaped configuration corresponding to the configuration of the passage 22 (FIG. 1) in the airfoil 10.

Similarly, the cantilevered center section 36 of the pattern 28 includes a pair of generally parallel arms 58 and 60 which extend axially outwardly from the end section 48. The free ends of the arms 58 and 60 are interconnected by a short connector section 62. This results in the cantilevered center section 36 of the pattern 28 having an elongated U-shaped configuration corresponding to the configuration of the passage 24 (FIG. 1) in the proposed airfoil 10.

With the exception of the end sections 48 and 50, the pattern 28 is the same size and has the same configuration as the configuration of the space in the cooling fluid passage system 12 in the proposed airfoil 10. Although the pattern 28 has a configuration which corresponds to one specific cooling fluid passage system for one specific proposed airfoil, it should be understood that the pattern 28 could have a configuration corresponding to the configuration of any one of many different cooling fluid passage systems. Thus, the pattern 28 could have a configuration which corresponds to the configuration of a cooling fluid passage system in which cooling fluid flows through openings formed in the trailing edge portion 40 of the proposed airfoil.

To form a full size model of the cooling fluid passage system 12, the pattern 28 is covered with a layer of metal. The pattern 28 is then removed from the metal covering to form passages within the covering. These passages have a configuration corresponding to the configuration of the cooling fluid passage system 12 in the proposed airfoil 10.

Although the cooling fluid passage system formed within the covering will have a configuration corresponding to the configuration of the cooling fluid passage system 12 in the proposed airfoil 10, the exterior of the covering will have a substantially different configuration than the exterior of the proposed airfoil. This is because the exterior of the covering formed by the thin layer over the pattern 28 will have a configuration which is a function of the configuration of the cooling fluid passage system 12. The exterior surfaces of the proposed airfoil will have a configuration which is determined by the desired flow of gas around the outside of the proposed airfoil.

It is contemplated that the covering over the pattern 28 may be formed in many different ways. However, it is believed to be advantageous and is presently preferred to form the covering over the pattern 28 by electroplating a thin layer of metal over the pattern. Once the thin layer of metal has been electroplated over the pattern 28, the pattern is removed from within the thin layer of metal to leave a covering having passages with the same configuration as the cooling fluid passage system 12 in the proposed airfoil 10.

When a thin layer of metal is to be electroplated over the pattern 28, the outer surface of the wax pattern is made electrically conductive by spraying a continuous layer of silver or graphite over the entire outer surface of the pattern. Although it is preferred to spray the pattern 28 with silver or graphite, any other conductive material could be sprayed onto the pattern. It is also contemplated that the outer surface of the pattern 28 could be made conductive by application of an electroless nickel or nickel-cobalt coating or by vapor deposition of any desired metal. If the pattern 28 is formed of ceramic core material rather than wax, the outer surface of the pattern can be made conductive in the same manner as for a wax pattern.

The electrically conductive outer surface of the pattern 28 is then electroplated with nickel to form a continuous thin metal layer over the pattern. During the electroplating process, the pattern is the cathode and the anode is formed of nickel. Of course, other metals could be used if desired.

During the electroplating process, a thin layer 68 of metal is formed over the outer surface of the pattern 28 in the manner illustrated in FIGS. 3 and 4. The thin layer 68 of metal forms a covering which has an inner side surface with a configuration which corresponds to the configuration of the outer side surface of the pattern 28. Thus, the covering 68 has an inner side surface area 72 (FIG. 4) with a configuration corresponding to the configuration of the elongated edge section 38 of the pattern 28 and a passage 14 in the proposed airfoil 10. The covering 68 also has an inner side surface area 74 (FIG. 4) with a configuration corresponding to the configuration of the outer side surface of the edge section 44 of the pattern 28 and the passage 16 in the proposed airfoil 10.

In addition, the covering 68 has inner side surface areas 76 and 78 (FIG. 4) with configurations which correspond to the configurations of the arms 51 and 52 (FIG. 2) on the cantilevered section 34 of the pattern 28 and the passages 22 in the proposed airfoil 10. The covering 68 (FIG. 4) also has inner side surface areas 82 and 84 with a configuration corresponding to the configuration of the arms 58 and 60 of the cantilevered center section 36 (FIG. 2) of the pattern 28 and the passages 24 in the proposed airfoil 10.

Passages having configurations corresponding exactly to the cooling fluid passage system 12 in the airfoil 10 are formed in the covering 68 (FIG. 3) by removing the pattern 28 from the covering 68. To remove the wax pattern 28, an end wall 88 (FIG. 3) of the thin layer or covering 68 is cut away. In addition, an end wall 92 of the thin layer or covering 68 is cut away. This results in the formation of openings at opposite ends of the covering 68. The openings at opposite ends of the covering 68 have the same configuration as openings through which cooling fluid will flow during use of the proposed airfoil 10 in a turbine engine.

After suitable openings have been formed in the covering 68, the pattern 28 and covering 68 are heated to a temperature above the melting point of the wax material of the pattern 28 and below the melting point of the metal forming the covering 68. The melted wax material then flows out of an open end of the covering 68. Thus, the molten wax material flows out of the covering 68 through one or more of the openings which correspond to the openings through which cooling fluid is conducted by the passage system 12 in the proposed airfoil 10.

Any remaining wax material is cleaned out of the interior of the covering 68 by conducting a flow of hot solvent through the passage system formed in the covering 68. The layer of silver, if the pattern 28 was made conductive with silver, is then removed by a flow of a suitable reagent, such as nitric acid solution. This results in the formation of a cover 68 having a passage system 96 (FIGS. 3 and 4) with a configuration which corresponds to the configuration of the pattern 28 and to the configuration of the cooling fluid passage system 12 in the proposed airfoil 10.

It is contemplated that it may be preferred to form the pattern 28 of a ceramic core material in the manner previously described. If the pattern 28 is formed of a ceramic core material, the pattern is removed from the covering 68 by caustic leaching. When this is done, the covering 68 and pattern 28 are exposed to a caustic leaching solution. The covering 68 is not effected by the caustic leaching solution. However, the caustic leaching solution functions as a solvent to extract the core materials. The core materials and leaching solution flow out of the covering 68 through one or more of the openings which correspond to the openings through which cooling fluid is conducted to by the passage system 12 in the proposed airfoil 10.

Since the cover 68 is formed by a thin layer of metal, the outside of the cover will have a configuration which is generally similar to and is a function of the configuration of the passage system 96 in the cover. Thus, even though the cover 68 has an internal passage system 96 with the same configuration as the cooling fluid passage system 12 in the proposed airfoil 10, the outer side surfaces of the cover 68 will have a completely different configuration than the outer side surfaces of the proposed airfoil 10.

Although it is preferred to electroplate the cover 68 onto the pattern 28 in a manner generally similar to that described in U.S. Pat. No. 4,772,450, it is contemplated that the cover could be formed in other ways. Thus, if desired, the cover 68 could be formed by dipping the pattern 28 in a bath of liquid material. The wet layer of material over the pattern would then be hardened to form a cover from which the pattern 28 could be removed.

Once the pattern 28 has been removed from the thin cover 68 of electroplated metal, the flow of fluid (air) is conducted through the passage system 96 in the covering. During the flow of fluid through the passage system 96, characteristics of the fluid flow are determined. By determining characteristics of a flow of air or other fluid through the passage system 96 in the covering 68, the rate of flow of cooling fluid and/or other characteristics of the flow of cooling fluid through the passage system 12 in the proposed airfoil 10 can be predicted.

By knowing the rate of flow of air through the passage system 96 in the cover 68, the rate of flow of cooling fluid through the cooling fluid passage system 12 in the proposed airfoil 10 during operation of an engine can be reliably predicted. This prediction can be based on theoretical considerations and/or upon trial and error. Thus, the rate of flow of air through passage systems corresponding to the passage system 96 in the covering 68 can be compared to the actual rate of flow of cooling fluid through a corresponding cooling fluid passage system 12 in an airfoil 10 in a turbine engine. One specific air flow mass measurement system 102 is illustrated in FIG. 5. The air flow mass measurement system 102 is used to determine characteristics which are a function of fluid flow through the passage system 96 in the cover 68. The air flow mass measurement system 102 includes a source 104 of dry air, that is air having a dew point of 0° F. The air is conducted through a conduit 106 to a manifold chamber 108 in the manner indicated by an arrow 110 in FIG. 5. A sonic nozzle 112 is provided in the conduit 106.

A Pitot tube 114 is utilized to provide a signal to a control system 116. The signal from the Pitot tube 114 is indicative of the fluid pressure downstream from the sonic nozzle 112. In addition, a temperature sensor 118 provides a signal to the control system 116 indicating the temperature of the air downstream from the nozzle 112. A pressure tube 122 provides a signal to the control system 116 indicative of the fluid pressure upstream of the nozzle 112.

After the air has been conducted through the nozzle 112, it enters a manifold chamber 108. A pressure tube 126 provides a signal to the control system 116 indicative of the fluid pressure in the manifold chamber 108. In addition, a temperature sensor 128 provides a signal to the control system 116 indicative of the temperature of the air in the manifold chamber 108. It should be understood that the apparatus for determining the characteristics of fluid flow through the passage system 96 in the cover 68 could have a construction and mode of operation which is different than the construction and mode of operation of the system 102.

Air is conducted from the manifold chamber 108 through the passage system 96 (FIG. 3) in the cover 68. The air from the manifold chamber 108 enters the cover 68 through entrance passages in the same manner as in which cooling fluid would be conducted to the passage system 12 in the proposed airfoil 10. Air is conducted from the cover 68, in the manner indicated by the arrow 132 in FIG. 5. Air conducted from the cover 68 leaves the cover through openings in the same manner as in which cooling fluid would leave the passage system 12 in the proposed airfoil 10. Therefore, the rate of flow of air through the passage system 96 in the cover 68 will be a function of the rate of flow of cooling fluid through the passage system 12 in the proposed airfoil 10 when the airfoil is built and installed in an engine.

If the rate of flow of fluid (air) through the passage system 96 in the covering 68 corresponds to an unsatisfactory rate of flow of cooling fluid through the passage system 12 in the proposed airfoil 10, the construction of the proposed airfoil can be revised. When this is done, another pattern 28 having the configuration of the revised cooling system will be constructed, a covering formed and the characteristics of the flow of air through the covering determined in order to predict whether or not a satisfactory rate of flow of cooling fluid will be obtained through the modified cooling flow passage system in the modified airfoil.

Assuming that the characteristics of the rate of flow of air through the covering 68 correspond to a satisfactory flow of cooling fluid through cooling fluid passage system 12 in the proposed airfoil 10, fabrication of airfoils corresponding to the airfoil 10 proceeds. To fabricate an airfoil corresponding to the proposed airfoil 10, a core having the same configuration as the pattern 28 is constructed. The core is formed of a suitable ceramic material.

If the pattern 28 is formed of ceramic core material, the pattern will have been fabricated by the same process and with the same materials which are used to fabricate the core for use in molding the cooling fluid passage system 12 in the airfoil 10. The use of identical materials and processes to form the pattern 28 and the core for molding the airfoil 10 minimizes the possibility of the pattern 28 having a different configuration than the configuration of the core which is eventually used in molding the airfoil 10.

A wax pattern corresponding to the desired configuration of the exterior of the airfoil 10 is then injection molded around the ceramic core in a known manner. The wax pattern of the airfoil 10 and the core are then enclosed within a mold formed of ceramic material. The wax pattern of the airfoil is removed from the mold. Molten metal is then poured around the core and solidified. Once the molten metal has solidified around the core, the solidified molten metal and core are removed from the mold.

Once the solidified metal forming an airfoil corresponding to the proposed airfoil 10 has been removed from the mold, the core is removed from the airfoil by caustic leaching. This leaves a cooling fluid passage system corresponding to the cooling fluid passage system 12 of the airfoil 10. Air is conducted through the cooling fluid passage system 12 in the airfoil 10 to be certain that the cooling fluid passage system will function in a desired manner. Since the cooling fluid passage system in the cast metal airfoil will have the same configuration as the passage system 96 in the covering 68, the flow of cooling fluid through the cast metal airfoil should be satisfactory.

The manner in which the wax pattern of an airfoil is formed around a core and the core is used in a mold during the casting of a metal airfoil corresponding to the proposed airfoil 10 is the same as is described in U.S. Pat. No. 4,596,281. The core in the aforementioned U.S. Pat. No. 4,596,281 has the same general shape as the pattern 28 (FIG. 2) and the cooling fluid passage system 12 in the proposed airfoil 10. Of course, a core having a different configuration could be used to provide a fluid cooling passage system having a different configuration if desired.

Conclusion

The present invention relates to a new and improved method and apparatus for use in predicting the rate of flow of cooling fluid through a passage system 12 in a proposed airfoil 10. A model of the passage system in the proposed airfoil is constructed by forming a pattern 28 having the same configuration as the cooling fluid passage system 12 in a proposed airfoil 10. The pattern 28 is covered with a thin layer to form a covering 68 over the pattern. The pattern 28 is then removed from the covering 68.

Removing the pattern 28 from the covering 68 forms a passage system 96 having a configuration corresponding to the configuration of the cooling fluid passage system 12 in the proposed airfoil 10. A flow of fluid is then conducted through the passage system 96 in the covering 68. A characteristic of the flow of fluid through the passage system 96 in the covering 68 is determined to enable the rate of flow of fluid through the cooling fluid passage system 12 in the proposed airfoil 10 to be predicted.

Having described the invention, the following is claimed:

1. A method comprising the steps of covering a pattern of a cooling fluid passage in a proposed airfoil with a layer to form a covering over the pattern, removing the pattern from the covering to form a hollow article having an interior passage having a configuration corresponding to the configuration of the cooling fluid passage in the proposed airfoil and an exterior with a configuration which is substantially different than the configuration of the proposed airfoil, conducting a flow of fluid through the passage in the covering, and determining a characteristic which is a function of fluid flow through the passage in the covering.

2. A method as set forth in claim 1 further including the steps of forming a core having a configuration corresponding to the configuration of the pattern, at least partially enclosing the core with a mold, conducting a molten metal into the mold and around the core, solidifying the molten metal around the core to form a metal airfoil corresponding to the proposed airfoil, and removing the core from the metal airfoil to form a cooling fluid passage in the metal airfoil.

3. A method as set forth in claim 2 wherein the pattern of a cooling fluid passage through the proposed airfoil is formed of the same material as the core around which molten metal is conducted.

4. A method as set forth in claim 2 wherein the pattern of a cooling fluid passage through the proposed airfoil is formed of a ceramic material and the core around which molten metal is conducted is formed of ceramic material.

5. A method as set forth in claim 2 wherein the pattern of a cooling fluid passage through the proposed airfoil is formed of a polymeric material and the core around which molten metal is conducted is formed of a ceramic material.

6. A method as set forth in claim 1 wherein said step of covering a pattern of a cooling fluid passage through a proposed airfoil with a thin layer to form a covering over the pattern includes electroplating a layer of metal over the pattern.

7. A method as set forth in claim 1 wherein said step of removing the pattern from the covering includes the step of heating the pattern and covering to a temperature above the melting temperature of the pattern and below the melting temperature of the covering and conducting a flow of pattern material from the covering.

8. A method as set forth in claim 1 wherein said step of determining a characteristic which is a function of fluid flow through the passage in the covering includes determining the rate of flow of air through the passage in the covering.

9. A method as set forth in claim 1 wherein said step of determining a characteristic which is a function of fluid flow through the passage in the covering includes determining the fluid pressure adjacent to an opening where fluid enters the covering.

10. A method as set forth in claim 1 further including the step of removing a portion of the covering to form an opening to the interior of the covering, said step of removing the pattern from the covering includes conducting a flow of pattern material out of the covering through the opening, said step of conducting a flow of fluid through the passage in the covering includes conducting a flow of fluid through the opening.

11. A method of predicting the rate of flow of cooling fluid through a cooling fluid passage in a proposed airfoil, said method comprising the steps of forming a hollow article having an interior passage with a configuration corresponding to the configuration of the cooling fluid passage through the proposed airfoil and an exterior with a configuration which is substantially different than the configuration of the proposed airfoil, conducting a flow of fluid through the hollow article, and determining a characteristic which is a function of the rate of flow of fluid through the hollow article while performing said step of conducting a flow of fluid through the hollow article.

12. A method as set forth in claim 11 wherein said step of forming a hollow article includes electroforming a layer of metal over a pattern and removing the pattern from the layer of metal.

13. A method as set forth in claim 11 wherein there are a plurality of cooling fluid passages having different configurations in the proposed airfoil, said step of forming a hollow article includes forming a hollow article with a plurality of cooling fluid passages.

14. A method comprising the steps of electroplating a layer of metal over a pattern of a cooling fluid passage in a proposed airfoil, removing the pattern from the electroplated layer of metal to form a passage defined by the electroplated layer of metal and having a configuration corresponding to the configuration of the cooling fluid passage in the proposed airfoil, conducting a flow of fluid through the passage defined by the electroplated layer of metal determining at least one characteristic of fluid flow through the passage defined by the electroplated layer of metal, forming a core having the same configuration as the pattern, forming a pattern of the proposed airfoil around the core, at least partially enclosing the core and the pattern of the proposed airfoil with a mold, removing the pattern of the proposed airfoil from the mold while leaving the core in the mold, and conducting molten metal into the mold.

15. A method as set forth in claim 14 wherein the pattern of a cooling fluid passage and the core are formed of the same material.

* * * * *

UNITED STATES PATENT AND TRADEMARK OFFICE
CERTIFICATE OF CORRECTION

PATENT NO. : 5,358,029

DATED : October 25, 1994

INVENTOR(S) : Gurmohan S. Baveja, Robert M. Brozier, Albert C. Hoekenga, and Francis J. O'Connor It is certified that error appears in the above-indentified patent and that said Letters Patent is hereby corrected as shown below:

Column 10, line 11, after "metal" insert --,--.

Signed and Sealed this

Seventh Day of February, 1995

Attest:

BRUCE LEHMAN

Attesting Officer

Commissioner of Patents and Trademarks